United States Patent [19]

Gladstone et al.

[11] Patent Number: 4,596,264
[45] Date of Patent: Jun. 24, 1986

[54] FLOW CONTROL VALVE

[75] Inventors: Roland A. Gladstone, Morton Grove; Arnold V. Dano, Park Ridge, both of Ill.

[73] Assignee: Mark Controls Corporation, Evanston, Ill.

[21] Appl. No.: 634,639

[22] Filed: Jul. 26, 1984

[51] Int. Cl.⁴ ............................................. G05D 16/00
[52] U.S. Cl. ................................... 137/85; 137/116.5
[58] Field of Search ................ 137/85, 116.5; 251/285

[56] References Cited

U.S. PATENT DOCUMENTS

| | | | |
|---|---|---|---|
| 1,881,367 | 10/1932 | McKesson | 251/285 X |
| 2,659,381 | 11/1953 | Seljos | 137/85 |
| 2,984,252 | 5/1961 | Bryant | 137/116.5 X |
| 4,111,222 | 9/1978 | Hassell | 137/116.5 X |
| 4,438,662 | 3/1984 | Walton | 137/85 X |

*Primary Examiner*—Alan Cohan
*Attorney, Agent, or Firm*—Welsh & Katz, Ltd.

[57] ABSTRACT

A fluid flow pressure control valve includes a valve body having a chamber divided by a dashpot plate into an inlet chamber and a dampened flow region chamber. A diaphragm senses the fluid pressure forces in the chamber with an adjustable spring force acting to balance the fluid pressure forces exerted on the other side of the diaphragm. By varying the spring force with a follower piece, which moves axially along a stationary threaded shaft, the amount of fluid pressure necessary to balance the spring force can be selectively varied. The follower can be blocked from travel beyond selected locations by stops positioned on the valve housing and thus a plurality of desired pressure values can be reliably chosen. Fluid flow induced oscillations of the compact, easily installed valve are attenuated by a dashpot means which includes the dashpot plate with an aperture therethrough providing communication between the inlet chamber and the dampened flow region chamber.

6 Claims, 7 Drawing Figures

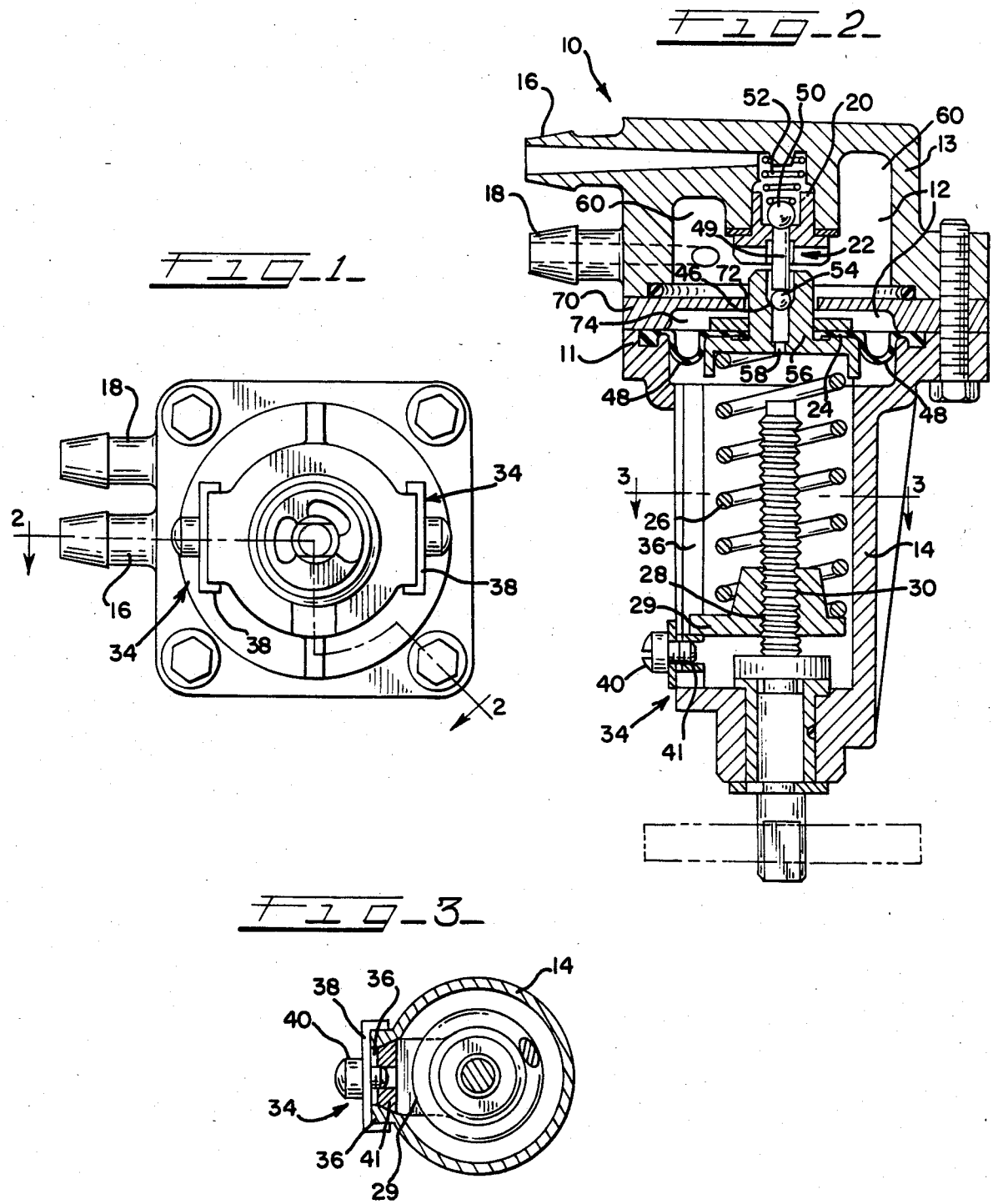

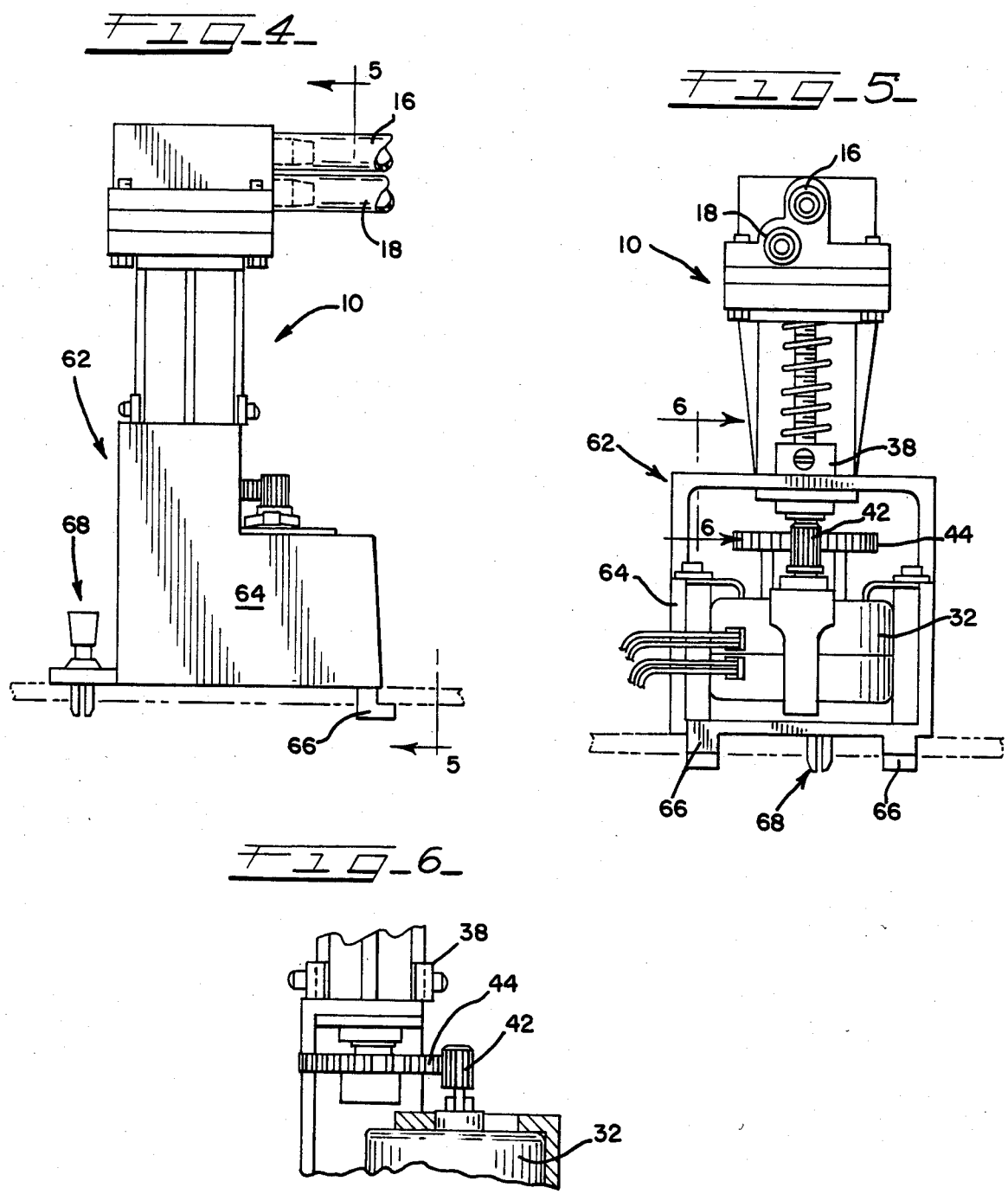

FLOW CONTROL VALVE

The present invention relates to a fluid flow pressure control valve and more particularly to a force balance controlled fluid flow pressure valve.

Previous fluid flow pressure control valves have suffered from certain deficiencies and limitations. In particular, many prior force balance gas flow pressure control valves have used an axially translating drive shaft to apply a mechanical force to a force sensing means to balance gas flow pressure at a desired level. This type of force balance control structure has made calibration and determination of pressure set points difficult and imprecise. In addition, some prior gas flow pressure control valves which have been designed to be quite compact have experienced vibrational difficulties due to the small size, lack of rigidity, and high gas flow rates.

Accordingly, a general object of the present invention is to provide an improved fluid flow pressure control valve.

A more particular object of the invention is to provide an improved fluid flow pressure control valve having structural features which readily allow calibration of flow pressure and the positioning of predetermined flow pressure set points.

Another object is to provide an improved compact, force balance flow pressure control valve which is free of gas flow induced vibration or oscillation.

A further object is to provide an improved flow pressure control valve which is packaged in a compact bracket which allows the valve to be easily mounted and demounted.

Further objects and advantages of the present invention, together with the organization and manner of operation thereof, will become apparent from the following detailed description of the invention taken in conjunction with the accompanying drawings wherein:

FIG. 1 is a top view of the valve body;

FIG. 2 is a view of a cross section taken generally along line 2—2 shown in FIG. 1; and FIG. 3 is a bottom view of the valve body;

FIG. 4 is a side view of the valve mounted in a containment housing;

FIG. 5 is a front view taken along line 5—5 shown in FIG. 4;

FIG. 6 is a fragmentary sectional view taken along line 6—6 shown in FIG. 5.

DETAILED DESCRIPTION

Figure 7:
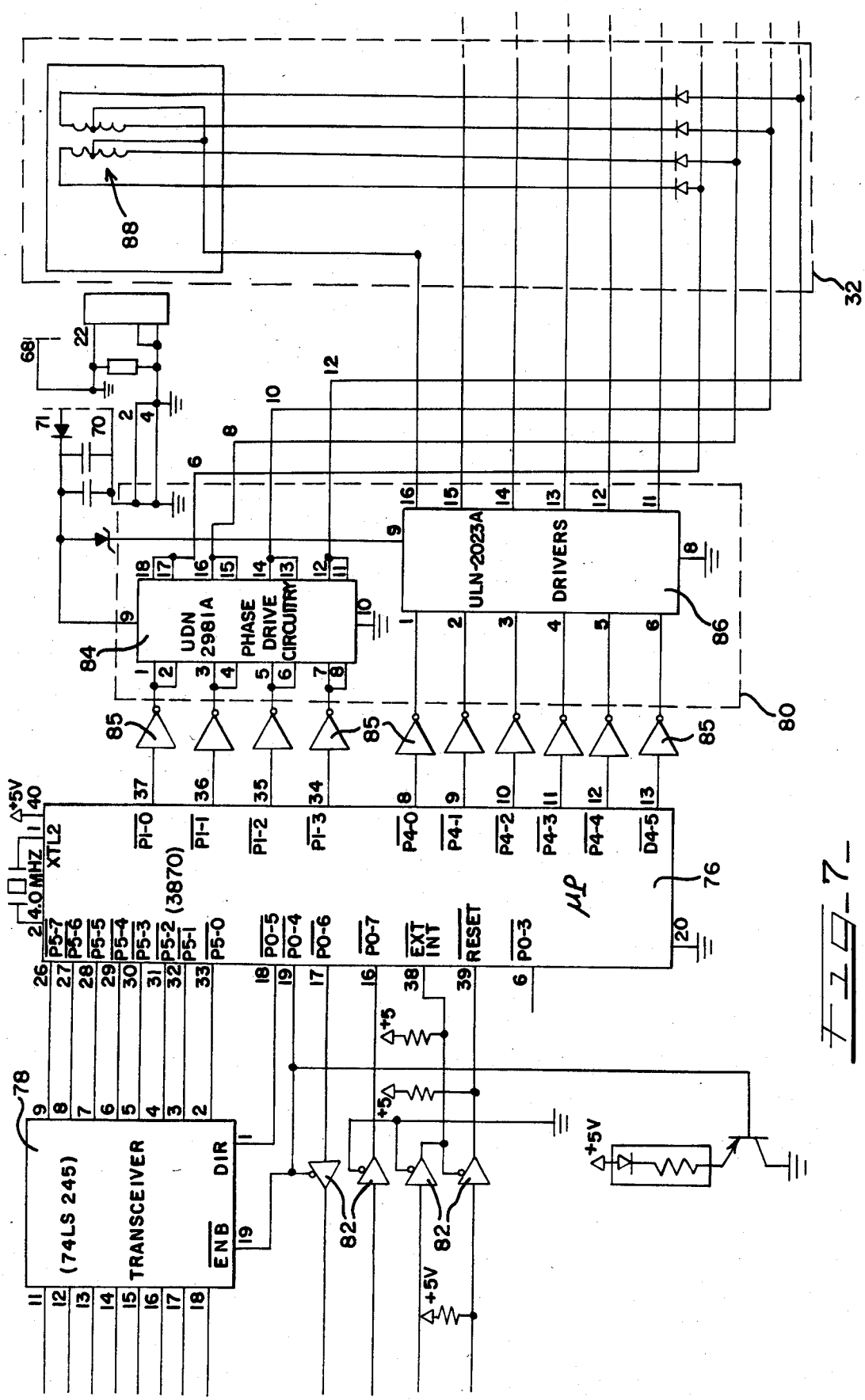
FIG. 7 is an electrical schematic circuit diagram of the microprocessor-based control system for a plurality of valves.

Broadly stated, the present invention comprises a fluid flow pressure control valve of the force-balance type. The pressure control valve has operational advantages, due to its structure, which enables it to be reliably and easily calibrated to provide accurate pressure set points. The valve is compact in size and yet operates without pressure oscillatory vibration that is often achieved only with larger, stiffer valve designs. The fluid flow pressure control valve has a valve body with a chamber, and the valve body has at least one valve seat which may be selectively opened and closed on the fluid supply side. In a preferred form of the invention, a return valve vent seat is also provided which may be selectively opened and closed on the fluid return side to enable the venting of the desired levels of fluid to the atmosphere.

The valve includes a fluid force sensing means, comprising a diaphragm, for sensing the pressure induced forces within the valve body chamber and a valve closure means coupled to the diaphragm. The valve closure means includes a ball valve assembly with a ball on at least one end of a rod, and preferably has balls on opposite ends of the rod, which enables the opening or closing of the valve seats. The gas pressure forces exerted on the diaphragm are balanced by an adjustable force means, such as a spring mechanism, which exerts an opposing force on the opposite side of the diaphragm, to establish a preselected limit of gas pressure within the valve body chamber. The degree of displacement of the spring mechanism is readily set by a movable follower means operably coupled to a journaled, rotatable shaft driven by a motor. The follower means may be driven to a predetermined location with movement beyond that location prevented by a positionable stop means. When the follower encounters the stop means, the follower is prevented from further displacement of the spring and thus the fluid pressure forces balance the fixed spring force, leading to a fixed fluid flow pressure.

Hereinafter, reference will be made to control of flow pressure only for gases, but it is to be understood that the invention can also be used to control flow pressure of fluids such as gas-vapor mixtures (for example, steam-water vapor mixtures) provided the valve is constructed of materials appropriate to withstand the particular chemical, mechanical, thermal and other effects to which it is exposed. Additionally, normal operation of the valve provides exhausting of the fluid to the exterior of the valve. If the fluid is a liquid, care should be taken to contain the exhausted fluid so that it does not detrimentally affect either the immediate area or other components of the valve itself. If the fluid is a gas other than air, containment or exhausting of the gas from the environment may also be required.

Referring now to the drawings, FIGS. 1-6 illustrate one embodiment of the flow pressure control valve used in the present invention, indicated generally at 10 in FIG. 2, which has a valve body 11 with a chamber 12. The valve body 11 includes an upper valve housing 13 and a lower valve housing 14. The lower valve housing 14 includes a gas supply port 16, a gas return port 18, a supply valve seat 20, and a ball valve assembly 22 which may be moved to selectively open and close the supply valve seat 20. The valve 10 further includes a pressure-force sensing means, preferably a flexible diaphragm 24, for sensing the inlet gas pressure in the valve body 11. The upper valve housing 13 includes adjustable force applying means, which is preferably a compressed helical spring 26, for exerting a balancing force on the diaphragm 24 to balance gas pressure forces exerted thereon. The spring 26 is positioned by a follower 28 which can be selectively moved toward or away from the diaphragm 24 to variably adjust the force that is applied to the diaphragm 24 to vary the established balance point. Therefore, a particular gas flow pressure value is established in the valve body which produces a proportional gas flow output pressure through the return port 18.

The follower means 28, having a threaded aperture therethrough, engages the threads on a shaft 30 which is journaled for rotation. The follower 28 moves axially along the length of the rotatable shaft 30 and thus acts to displace the spring 26. The shaft 30 can be rotated by drive means, such as a motor drive 32 which can be controlled by a microprocessor and associated circuitry. Details of the control of the motor drive 32 will be discussed in more detail hereinafter.

Any one of various preselected gas pressure set points and/or gas pressure calibration points can be set by a positionable stop, indicated generally at 4, which prevents movement of the follower 28 beyond a predetermined location. In order to mount the positionable stop 34, the upper valve housing 13 shown in FIG. 2 includes at least one slot 36 which is shown in detail in FIG. 3. The stop 34 mounted to the slot 36 includes at least a first stop positionable to prevent movement of the follower 28 beyond a predetermined location along the slot 36. The follower 28 has an ear portion 29 which extends substantially perpendicular to the shaft 30 into the slot 36. In the illustrated embodiment, a slot bracket 38 has a screw 40 which extends through an aperture in the bracket 38. The screw 40 engages a stop member 41 which intersects the path of travel of the ear portion 29 and blocks the follower 28, preventing travel beyond the predetermined location in the slot 36. The screw 40 threadedly engages the stop member 41 and can be selectively rotated to tighten or loosen the stop 34. When tightened, the screw 40 pulls the stop member toward the bracket 38. As best shown in FIG. 3, because of the angles of the contacting surfaces of the stop member 41 and the slot 36, tightening the screw 40 pulls the stop member 41 into close contact which keeps it from moving when the ear portion 29 comes in contact with it. One of a number of different stops 34 can be attached to the bracket 38, for example, a bolt threadedly engaged with the bracket 38. The bracket 38 can then be positioned at the desired location along the slot 36, and the bolt of the bracket 38 can be extended to prevent movement of the follower 28 by blockingly encountering the ear portion 29 of the follower 28 as shown in FIG. 2. The slot 36 can also have precalibrated indicator marks along its length to enable selection of various desired gas pressure output values, if desired.

In another form of the valve used in the invention, a plurality of the stops 34 can be attached to the slot 36 in order to stop or block the movement of the follower 28 at a predetermined location. By fixing this location for the follower 28, the magnitude of the force exerted by the spring 26 is set to a preselected level. As indicated hereinbefore this preselected force level also yields a preselected limit on the gas flow pressure in the valve body chamber. One of the protrusions 40, such as the above mentioned bolt which is threadedly engaged with the bracket 38, can then block the path of the follower 28 to establish a preselected upper or lower limit of gas flow pressure.

A plurality of the stops 34 can also be used to increase the number of selectable gas pressure limits. By using threaded bolts to stop the follower 28, one can select the desired stop by driving one bolt into the path of travel of the ear portion of the follower 28. The maximum number of the stops 34 which can be mounted on the valve body is determined by how many can be positioned along the slot 36. Alternatively, one long slot bracket can extend the length of the upper housing 13 and a plurality of the bolts can be threadedly engaged with such a slot bracket to provide a plurality of stops for the follower 28.

In another form of the valve additional numbers of the stops 34 can be positioned along additional ones of the slots 36 located on the upper valve housing 13. For example, a plurality of the stops 34 can be positioned along four different ones of the slots 36 to provide a factory preset range of 1 to 15 psi pressure within the valve body chamber in increments of fractions of 1 psi. In another version of the valve the additional ones of the stop 34 enable the user to select, any desired intermediate pressure limit, as well as the factory preset selection of stops for preselected gas pressure limits.

Control of the gas pressure is therefore initiated through displacement of the follower 28 by the rotatable shaft 30. In order to enable ease of movement of the follower 28 and extend the line of the adjustable force means, a low friction material is preferred for use in the construction of the follower 28, such as delrin or teflon, for example.

Rotational control of the shaft 30 can be accomplished by a drive means, such as the low torque motor drive 32 shown in FIGS. 5 and 6. The motor drive 32 is coupled to the shaft 30 by a gear train which includes motor drive gear 42 and a driven gear 44 threadedly engaged to the shaft 30. A preferred form of the motor drive has a gear reduction ratio of about 4:1 to provide the desired range of movement for altering and setting precise gas pressure values in the range of 1 to 15 psi.

As discussed hereinbefore, the valve 10 achieves the desired gas flow pressure by a force balance method of operation in which gas pressure forces are balanced by adjustable mechanical forces. Control of the gas flow through valve 10 is therefore accomplished by displacement of a valve closure means in conjunction with the process of balancing gas pressure forces with an adjustable mechanical force. In the valve as shown in FIG. 2, the valve closure means is the ball valve assembly 22 which will be discussed in more detail hereinafter. The ball valve assembly 22 is constructed to be displaceable toward or away from engagement with the supply valve seat 20 and a return valve vent seat 46 (hereinafter return valve seat 46). The amount of displacement of the ball valve assembly 22 is determined by how large the gas pressure must be to balance the force exerted by the spring 26 which is coupled to the ball valve assembly 22. The displacement of spring 26 may be changed to selectively cause opening and closing of gas supply valve seat 20 and the return valve seat 46 to attain the desired gas pressure. In the valve illustrated in FIG. 2, gas pressure forces are exerted on the flexible diaphragm 24 positioned between the upper valve housing 13 and the lower valve housing 14.

In a preferred form of the valve 10, the diaphragm 24 is a flexible membrane having a convoluted or rounded annular surface 48 as shown in FIG. 2. The function of the convoluted surface 48 is to maintain a nearly constant surface area for the flexible membrane when exposed to the gas, regardless of the location of the diaphragm through its extent of travel. The area of the diaphragm 24 is maintained nearly constant by having an unstretched shape surface of large area, such as toroidal or other high surface area shape. Therefore, when the diaphragm moves up or down, the percentage change in surface area is proportionately smaller if the starting area is large. This substantially constant area for the diaphragm 24 insures a proper characterization of the gas pressure on the diaphragm 24 and also insures the proper gas flow pressure through the valve body. The force is the pressure per unit area, and by maintaining a constant area for the diaphragm 24 the gas pressure force varies in direct and linear proportion to pressure. Therefore, as the gas pressure increases, the resulting gas force will not be exaggerated due to a drastically changing surface area for the diaphragm 24. Consequently, a certain percentage change in the force exerted by the spring 26 will be reflected by a known, fixed percentage change in gas flow pressure. For example, if the diaphragm area remains constant, an X percent increase in the spring force might result in a 10 percent increase in gas flow pressure regardless of the pressure level. However, if the surface area of the diaphragm 24 changes sufficiently with a change in gas pressure, an X percent increase in the spring force might result in a 10 percent increase in gas flow pressure at the 1 psi pressure level but in a 15 percent increase at the 10 psi pressure level. The substantially constant surface area exposed to gas pressure therby results in a linear operation that advantageously corresponds to the linear force that is applied by changing the follower 28 position.

The closure means, such as the ball valve assembly 22 illustrated in FIG. 2, is coupled to the diaphragm 24. The ball valve assembly 22 includes a rod 49 with at least a supply valve ball 50 attached to the supply end of the rod 49 and can selectively be engaged and disengaged with the supply valve seat 20. A supply valve spring 52 urges the supply valve ball 50 into engagement with the supple valve seat 20. Other configurations can be used which will effect a closure and which can be coupled to the diaphragm 24 to control gas flow. For example, O-ring gaskets or other gaskets can be engaged to the supply valve seat 20.

In the valve 10 shown in FIG. 2, the other end of the rod 49 has a return valve ball 54 attached thereto and is coupled to the diaphragm 24, which is displaced responsive to gas pressure forces. The return valve ball 54 can be selectively engaged and disengaged to the return valve seat 46 embodied within a piston plate assembly 56 which is coupled to the diaphragm 24. In this form of the valve 10, the diaphragm 24 comprises a rubber material which is in sealing engagement around the piston plate assembly 56 to insure gas flow past the diaphragm 24 only through the vent passageway 58. Consequently, depending on the position of the ball valve assembly 22 with respect to the supply valve seat 20 and the return valve seat 46, the supply valve and vent passageway 58 will be open or closed. For example, if gas pressure is low in the inlet chamber 60, the force from the spring 26 is greater than the gas pressure induced force on the diaphragm 24, and the diaphragm 24 is displaced toward the supply valve seat 20. This causes displacement of the ball valve assembly 22, and the supply ball 50 unseats from the supply valve seat 20 whereupon gas enters the inlet chamber 60 through supply port 16. As the gas pressure in the inlet chamber 60 increases, the gas pressure forces opposing the spring forces increase until the forces are balanced. Once the forces are balanced the supply ball 50 again seats to the supply valve seat 20 and gas flow is stopped to the inlet chamber 60.

If on the other hand the gas pressure in the inlet chamber 60 is too high, the diaphragm 24 displaces a sufficient distance to unseat the return valve ball 54, and gas is vented to the atmosphere through the vent passageway 58 in the piston plate assembly 56. Therefore, the position of the ball valve assembly 22 is determined by the balance point which results from gas pressure induced forces and the forces from the adjustable force means, such as the spring 26.

In other forms of the valve 10, the return valve seat 46 can be omitted and replaced with other appropriate venting means. Venting can be accomplished by a spring loaded ball valve vent which is decoupled from the ball valve assembly 22. The desired vent pressure can be selected by using a spring of predetermined compression.

The control of the motor drive 32 which drives the shaft 30 coupled to the follower 28 can be accomplished in one form of the invention by a control circuit, as shown in FIG. 7, which provides control signals comprising digital pulses from a microprocessor 76. As shown in FIG. 7 the control circuit comprises a backplane interface 78. In the preferred embodiment the backplane interface is an eight line parallel transceiver which enables bidirectional communication between the microprocessor 76 and monitoring and control signal sources, such as from a central control console. Temporary storage of data is accommodated by a number of buffers 82 which are coupled to line cards (not shown). Responsive to control signals and/or separate software control, such as an associated ROM (not shown), the microprocessor 76 outputs signals to a valve interface 80 which includes phase drive circuitry, indicated generally at 80 for providing phase control signals. Phase drive control signals are output from the microprocessor 76 and the signals are inverted and the current boosted by signal inverters 85. The phase drive control signals from the microprocessor 76 are selectively input to the phase drive circuitry 84 which results in closure of one or more of the pairs of two-transistor gates on the input side of the drive circuitry 84. Responsive to the input signals the drive circuitry 84 outputs a phase signal voltage high to the selected coil or coils of the motor drives 32. Energization of each motor drive 32 is then accomplished by the microprocessor 76 providing an input to driver 86. The driver 86 in turn provides on one or more of the six lines (pins 11–15 in FIG. 7) an enabling low signal to the selected ones of the motor drives 32. The phase signal voltage high from the phase drive circuitry 84 is therefore provided to the selected one of the coils 88 of the selected motor drive 32, and the circuit is connected effectively to ground by the presence of the enabling low signal from the driver 86. In the preferred embodiment six motor drives 32 are controlled by the valve interface 80 which comprises the associated phase drive circuitry 84 and the driver 86.

The microprocessor 76 can therefore provide programmed signals to the motor drive 32 which results in a constant gas flow pressure output, a controlled changing output, or a combination of periods of constant pressure interspersed with periods of changing pressure. The microprocessor 76 also allows control of a plurality of flow control valves at the same location, or at different locations if the appropriate communication means is provided.

In order to provide a compact, efficient design for a configuration comprising a plurality of the valves 10, a small power supply is also utilized. The small power supply provides a limited quantity of power for valve control, and power consumption is minimized through selective control by the microprocessor-multiplexer system. The system selectively outputs control drive signals in accordance with a software program which utilizes the motor drive direction of travel, the speed of travel, an indication as to the last time the valve was moved and the absolute drive position for each of the motors for the plurality of the valves 10. Consequently, the microprocessor-multiplexer system enables minimization of power required to control the operation of the valves 10. The microprocessor uses this input data to select one or more of the valve motor drives which require moving to obtain the desired pressure output. In particular, the microprocessor selects the maximum number of valve motor drives to be driven in one direction with the maximum number determined by maximum power consumption limits. Furthermore, power supply requirements are minimized by generating output signals to the selected motor drives in an on-off cyclic nature.

The valve 10 can be mounted for general field use by a housing bracket, indicated generally at 62 in FIGS. 4 and 5. The housing bracket 62 is designed to complement the compact valve size and enable easy installation and removal from a picket board (not shown) for holding a plurality of other such valves. The housing bracket 62 includes a valve containment housing 64 having ear mountings 66 and a snap fastener 68 for quick attachment and removal from the picket board.

Gas flow induced oscillations of the valve 10, and in particular of the gas flow control elements shown in detail in FIG. 2 (the diaphragm 24, the piston plate assembly 56, and the ball valve assembly 22) are attenuated by a dashpot means which acts to dampen the gas flow within the valve 10. Excessive oscillation of these gas flow control elements can result in large unwanted oscillations in output gas flow pressure. In the form as shown in FIG. 2, the dashpot means comprises a dashpot plate 70 and the coupled piston plate assembly 56 extending through the dashpot plate 70. An annular passageway 72 is formed between the outside cylindrical portion of the piston plate assembly 56 and the vent passageway 58 through the dashpot plate 70. In a preferred form of the dashpot means, the annular passageway 72 is several thousandths to tens of thousandths of an inch in width and acts to restrict gas flow from the inlet chamber 60 into a dampened flow region chamber 74. Moreover, this annular passageway 72 also enables freedom of movement of the piston plate assembly 56 through the dashpot plate 70, and thus allows the diaphragm 24 attached to the piston plate assembly 56 to be responsive to the gas pressure forces and the forces from the spring 26, without introducing extraneous binding or frictional forces.

The attenuation of gas flow induced oscillations of the valve 10 can also be assisted by proper design of other portions of the valve 10. For example, oscillations can also be attentuated by using the proper density and mass for the dashpot plate 70 and/or the piston plate assembly 56. The use of low density aluminum metal for the piston plate assembly 56 minimizes unwanted oscillations of the gas flow control elements of the valve 10.

This invention overcomes a number of deficiencies and shortcomings of previous flow control systems by operating a plurality of flow control valves simultaneously to minimize disruption of flow variables in the system while using residual power from the pneumatic system to operate the control system. The invention also enables calibration of the flow valves by selectively driving each of the valves to an end point using less than the normal number of phases of power in order to avoid overdriving the valve motor and coupled valve drive assembly.

While there have been described herein various embodiments illustrative of the present invention, modifications will be apparent to those skilled in the art. Various features of the invention are defined in the appended claims.

What is claimed is:

1. A force balance controlled fluid flow pressure valve for control of fluid flow comprising:
   a valve body having a body chamber, a supply port and a return port and a supply valve means and a return valve located between said supply and return ports;
   pressure-force sensing means for sensing fluid forces in said valve body chamber;
   a first closure means coupled to said pressure-force sensing means and responsive to movement of said sensing means to selectively open and close said supply valve means for increasing pressure in said valve body chamber;
   a second closure means coupled to said pressure-force sensing means and responsive to movement of said sensing means to selectively open and close said valve seat means for decreasing pressure in said valve body chamber;
   shaft means journaled for rotation and adapted to be rotatably driven by a motor means;
   spring means about said shaft means for exerting a force on said pressure-force sensing means to act in opposition to fluid pressure forces exerted on an opposite side of said sensing means;
   a pair of longitudinal slots on said valve body, each of said slots being parallel with said shaft means;
   follower means formed of a low friction material and threadedly engaged with said shaft means and engaged with each of said slots for axial movement of said follower means with respect to said shaft means responsive to rotation of said shaft means, said follower means thereby compressing said spring means toward and away from said pressure-force sensing means;
   a pair of adjustable stop means, each being axially adjustably positionable in one of said slots to limit movement of said follower means between two adjustably predetermined locations in said slot; and
   a dashpot means for attenuating fluid flow-induced oscillations, said dashpot means including a dashpot plate and a platen plate assembly dividing said valve body chamber into an inlet chamber and a dampened flow chamber, said piston plate assembly providing a seat for said spring means for the transmission of the pressure generated by said spring means to said pressure force sensing means, and an annular space of at least several thousands of an inch width about said piston plate assembly for permitting the flow of fluid between said inlet chamber and said dampened flow chamber and for the attenuation of fluid flow-induced oscillations, while allowing freedom of movement of said piston plate assembly through said dashpot plate.

2. The apparatus as defined in claim 1 further characterized in that said motor means comprises a stepping motor operably coupled to said shaft means.

3. The apparatus as defined in claim 2 further characterized in that said stepping motor is driven by a pulsed digital signal means.

4. The apparatus as defined in claim 1 further characterized in that said pressure-force sensing means comprises a flexible membrane seated to a piston plate assembly and able to be seated to said valve body.

5. The apparatus as defined in claim 1 further characterized in that said flexible membrane comprises a partition having a convoluted surface for maintaining substantially constant surface area upon displacement of said flexible membrane.

6. The apparatus as defined in claim 1 further characterized in that said drive means comprises a low torque stepping motor.

* * * * *

UNITED STATES PATENT AND TRADEMARK OFFICE
CERTIFICATE OF CORRECTION

PATENT NO. : 4,596,264
DATED : June 24, 1986
INVENTOR(S) : Gladstone et al.

It is certified that error appears in the above-identified patent and that said Letters Patent is hereby corrected as shown below:

Column 3, line 8, change "4" to --34--.

Column 4, line 15, change "line" to --life--.

Column 5, line 30, change "supple" to --supply--.

Column 6, line 27, change "80" to --84--.

Column 8, line 48, change "platen" to --piston--.

Signed and Sealed this

Twenty-first Day of October, 1986

[SEAL]

Attest:

DONALD J. QUIGG

Attesting Officer

Commissioner of Patents and Trademarks